(12) United States Patent
Chen et al.

(10) Patent No.: US 6,510,455 B1
(45) Date of Patent: Jan. 21, 2003

(54) ELECTRONIC MAIL MESSAGE CHECKING SYSTEM

(75) Inventors: Guan-Hua Chen, Chiang-Su (CN); Yong-Cai Bian, Chiang-Su (CN); Cheng-Shing Lai, Taipei (TW); Jing Cao, Chiang-Su (CN)

(73) Assignee: Inventec Corporation (TW)

( * ) Notice: Subject to any disclaimer, the term of this patent is extended or adjusted under 35 U.S.C. 154(b) by 0 days.

(21) Appl. No.: 09/388,187

(22) Filed: Sep. 1, 1999

(51) Int. Cl.[7] .............................................. G06F 15/16
(52) U.S. Cl. ....................................................... 709/206
(58) Field of Search ................................ 709/203, 206, 709/207, 213, 217

(56) References Cited

U.S. PATENT DOCUMENTS

| | | | |
|---|---|---|---|
| 6,182,078 B1 | * | 1/2001 | Whitmyer et al. ............. 707/10 |
| 6,182,136 B1 | * | 1/2001 | Ramanathan et al. ........ 709/224 |
| 6,275,850 B1 | * | 8/2001 | Beyda et al. ................. 709/206 |

* cited by examiner

Primary Examiner—David Y. Eng (57) ABSTRACT

A system, a device and their relative methods for displaying the latest messages from an E-mail account under the conditions where there is no need to take the initiative in turning on a computer are disclosed. The incoming E-mail displaying system comprises: a displaying device for displaying new mails arrived from an E-mail box; a mail message service device responsive for searching a mail message in Internet, and responsive for transmitting the mail message through a transmission path; and a switching device responsive to the transmission path for receiving the mail message from the mail message service device and transmitting the mail message to the displaying device. Moreover, the displaying device can be further designed to comprise an input module, a telephone interface end, a displaying module, and a modem having embedded TCP/IP and E-mail client application et cetera functions. That is, enabling the displaying device to make a direct connection to Internet.

69 Claims, 7 Drawing Sheets

ELECTRONIC MAIL MESSAGE CHECKING SYSTEM

BACKGROUND OF THE INVENTION

Field of the Invention

The present invention relates generally to Internet communication system, and more particularly, relates to a system, a device and their relative methods for displaying the latest messages from an E-mail account under the conditions where there is no need to take the initiative in turning on a computer. 2. Description of the Prior Art Internet is a globalized wide area network (WAN), in which telephone lines or dedicated lines are used among connections within global users. In virtue of convenient, concealed, prompt, and low cost predominance provided by Internet, the rate of expansion of Internet and the rate of growth of the user group are respectably incredible. Internet is also becoming a living essential for humans, wherein the main services that have been put to use are electronic mail (E-mail) and file transfer protocol (FTP).

E-mail is taking advantage of computer to accomplish the work of sending and receiving messages, where it is very different to the conventional way of composing mails by pen and paper. When an user want to send a letter to another user or other users, the sender can simply use any text editor to type the letter into a computer, and using the computer network as a medium to send the letter to other user(s). The receiver(s) does not need to be on Internet for the time being, that is, no need to be inside this computer network. In fact, this E-mail is kept on Internet, at a place called "mail server". When the next time the receiver(s) enters this computer network, opens the mailbox, and takes out the letter, the message can be obtained easily.

In accompanying with the popularized E-mail service, E-mail and human living are becoming more and more close to each other that lead to an inseparable relationship. In general, one need to login to Internet in order to go a step further for sending/receiving E-mails. In the present day, the ways of connecting to Internet by E-mail clients can be separated into two types, which are: (1) clients make active dialup connections to Internet service provider (ISP); and (2) clients themselves having Internet Protocol (IP) addresses with fully function connections. Regardless of which, clients need to be on the initiative to get on the net for opening mailboxes, in order to be able to check through E-mails in time. Apart from it, how would those PC users to obtain the latest messages in their mailboxes without turning on the PC power source, these are all the unsolvable problems for the existing products.

SUMMARY OF THE INVENTION

In accordance with the above description of the prior art, the present invention provides solutions to all the drawbacks of the conventional Internet end products that have been introduced. The present invention provides an electronic mail (E-mail) checking system and method, which automatically download a client's latest E-mail messages from Internet. Wherein, the E-mail messages are delivered to the client end by passing through an existing communication network system.

Hence, it is an object of the present invention to provide an automatic E-mail checking system that automatically downloads new mails from the client's E-mail box (E-mail account) and sends those mails to the client end displaying device. The arrival of any new mail will be indicated by a viewing signal at the client end, which enables the client to check through E-mails in time.

Another object of the present invention is to provide an E-mail checking system that doesn't need to be on the initiative to turn on the computer and to get on the net by users, thus, saving resources and saving time.

Another more specific object of the present invention is to provide an E-mail checking system that comes with a time setting function for users to set their preferable time for automatic E-mail checking and searching through Internet for new E-mail messages.

Yet another object of the present invention is to provide a selection of oneself and reading function for users to handle their E-mail messages instantaneously, therefore, enhances working efficiency.

According to the above objects, the E-mail checking system been provided by the present invention comprises the followings: a displaying device for displaying new mails arrived from an E-mail box; a mail message service device responsive to a network system for searching a mail message in the network system, and responsive to a transmission path for transmitting the mail message through the transmission path; and a switching device responsive to the transmission path for receiving the mail message from the mail message service device and transmitting the mail message to the displaying device by passing through another network system. Wherein the switching device is established in between the displaying device and the mail message service device.

Moreover, the displaying device further comprises an input module, a telephone interface end, a displaying module, and a data handling module having embedded modem transmission control protocol/Internet protocol (TCP/IP) and E-mail client application et cetera functions.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
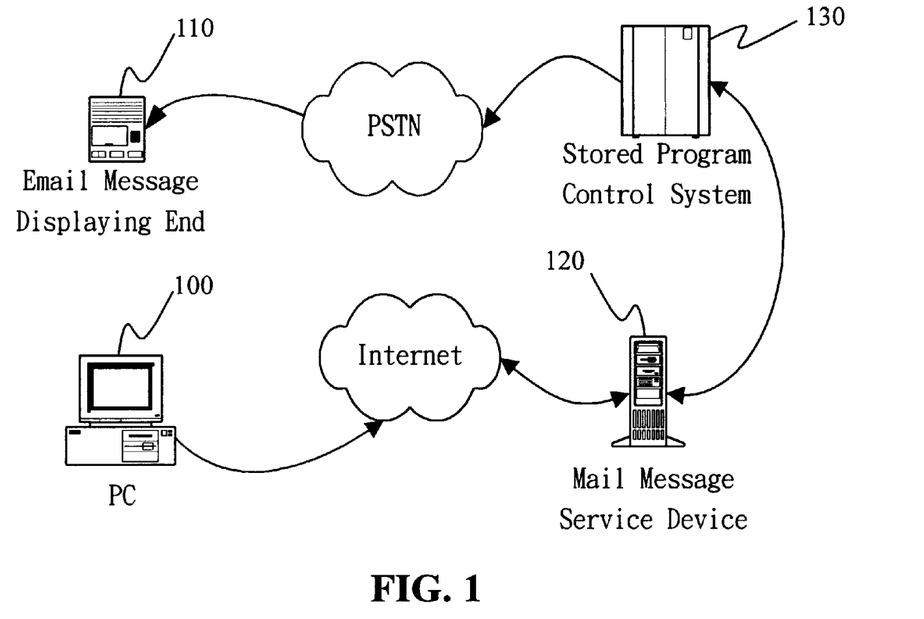
FIG. 1 is a network architectural diagram of a network capable of utilizing an embodiment of the present invention.

Referring now to the figures, FIG. 1 is a network architectural diagram of a network capable of utilizing an embodiment of the present invention, it not only shows the main devices required by the entire embodiment as well as the relationships between those devices. The incoming electronic mail (E-mail) displaying system of the present embodiment is capable of displaying the latest messages from an email account under the conditions where there is no need to take the initiative in turning on a computer and in getting on Internet. The incoming E-mail displaying system comprises a personal computer (PC) 100, an E-mail message displaying end 110, a mail message service device 120, and a stored program control system 130.

The PC 100 is used for accomplishing client registrations and sending (and/or receiving) electronic messages, wherein client registrations can also be accomplished by using any other registration channels, such as, on phone registration and paper registration. The content of client registrations required for E-mail message service includes client's full name, email box address, telephone number, et cetera.

The E-mail message displaying end 110 comprises a light emitting indicator, preferably light emitting diode (LED), for indicating the arrival of a new mail from an client's E-mail box, and a displaying screen for displaying the relative messages of the new mail, such as, the E-mail address of origin, the title, et cetera. Beyond all questions, the entire mail can be downloaded to the client's end, automatically receiving E-mails for the client. The corresponding messages of new mails are transmitted from the stored program control system 130 to the E-mail message displaying end 110 through an existing communication network system, such as, Public Switch Telephone Network (PSTN) wired system or satellite communication wireless system.

Stored program control system 130 is established in between the E-mail message displaying end 110 and the mail message service device 120, where the existing communication network system mentioned above acts as the connection bridge between the stored program control system and the E-mail message displaying end. Inside this stored program control system there includes a readable/writable recording medium and at least recording the mail messages, a dialing function, and a time-set redialing function.

Figure 2:
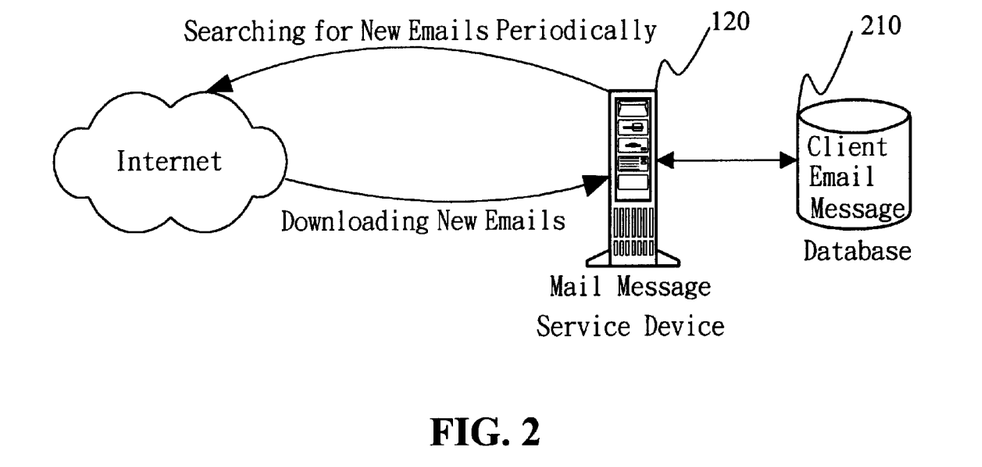
FIG. 2 is an illustrative diagram of showing the relationship between a mail message service device and Internet.

The mail message service device 120 of the present embodiment is used for searching and downloading new mail messages from Internet system, and responsive to a transmission path for transmitting the already downloaded mail messages and the client's telephone number to the stored program control system 130. FIG. 2 is an illustrative diagram of showing the relationship between the mail message service device 120 and Internet, wherein the mail message service device 120 searches through Internet for the latest messages in a registered client's E-mail box according to a set time. The searched messages are downloaded and stored into a database 210 straight away. This database is also a readable/writable recording medium and its recording apart from clients' mail messages further comprises the content of client registrations, which includes client's full name, email box address, telephone number, et cetera. Moreover, the mail message service device 120 recalls the content of the client registrations stored in the database 210 for accomplishing the above procedure of searching the latest messages in a registered client's E-mail box.

Figure 3:
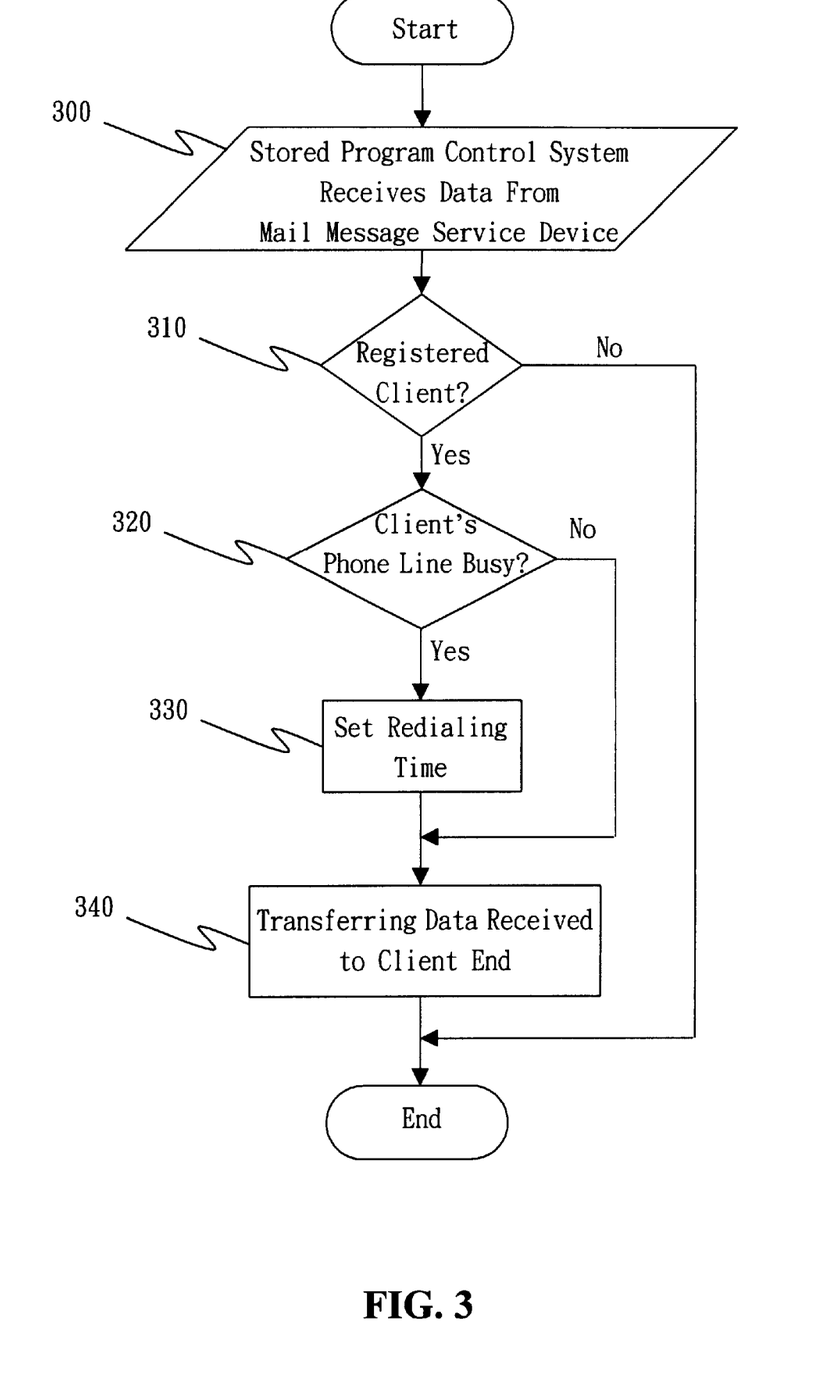
FIG. 3 is a flowchart summarizing the steps executed by the stored program control system shown in the network architectural diagram of FIG. 1.

FIG. 3 is a flowchart summarizing the steps executed by the stored program control system shown in the network architectural diagram of FIG. 1. Under the illustration in coordinating with this flowchart, an incoming E-mail displaying method of the present embodiment, which is capable in displaying the latest messages from an E-mail account under the conditions where there is no need to take the initiative in turning on a computer and in getting on internet. The incoming E-mail displaying method comprises: Firstly, an E-mail client needs to register for E-mail message automatic displaying service at the mail message service device, the content of client registrations required for E-mail message service includes client's full name, email box address, telephone number, et cetera. The mail message service device will then store the content of the client registrations into the database. Consequentially, the mail message service device will recall the content of the client registrations stored in the database to search and download the latest messages from registered clients' E-mail boxes according to a set time.

The downloaded messages are stored into the database as well, where these messages are send to the stored program control system in accompanying with client's telephone number. After the stored program control system received the mail messages send from the mail message service device 300, determining a registered client or not 310. If not, no further action will be taken. If is a registered client then detecting whether the client's phone line is busy 320, if not busy, transmitting the mail messages to the E-mail message displaying end 340. If the phone line is busy then set a waiting time, redial and transmit the mail messages afterward 330. Finally, the success of data transmission will be indicated by a light emitter at the E-mail messages displaying end for indicating the arrival of the new mail messages, and the new mail messages are displayed on the E-mail messages displaying end.

Figure 4:
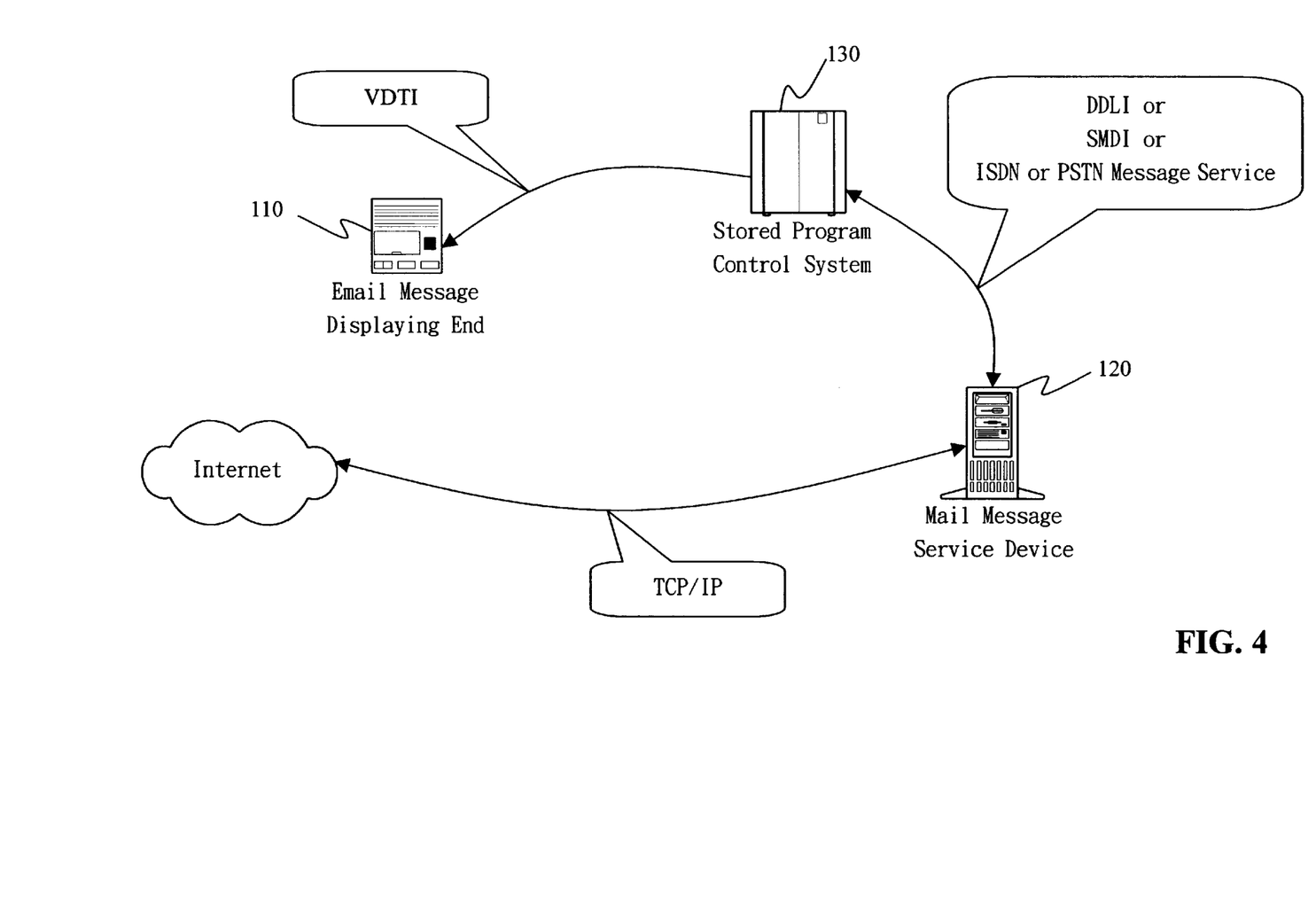
FIG. 4 is an illustrative diagram of showing the possible protocols been used in the network architectural diagram of an embodiment of the present invention.

FIG. 4 is an illustrative diagram of showing the possible protocols been used in the network architectural diagram of the present embodiment of the present invention. The connection between the mail message service device 120 and Internet adopts the TCP/IP group. The TCP/IP group include hundred of different protocols, wherein Transmission Control Protocol (TCP) and Internet Protocol (IP) provide the common use network data transmission means. Protocols used in the application layer are responsible for providing E-mail and its corresponding services.

The application layer protocol between the mail message service device 120 and the stored program control system 130 can be defined by the data transmitting functions that required to realize the present embodiment. The protocols used between the mail message service device 120 and the stored program control system 130 comprise application layer protocol, transport layer protocol, and physical layer protocol. The existing common use protocols are Dedicated Data Link Interface (DDLI), Simplified Message Desk Interface (SMDI), Integrated Services Digital Network (ISDN), and PSTN message service.

The application layer protocol between the stored program control system 130 and the E-mail message displaying end 110 can be defined by the data transmitting functions that required to realize the present embodiment. The transmission protocol used in between the stored program control system 130 and the E-mail message displaying end 110 is Voiceband Data Transmission Interface (VDTI).

In the system of the present invention, the E-mail message displaying end 110 having embedded TCP/IP protocols is able to make a direct contact to Internet for automatically downloading the mail messages, and this is where we begin an another embodiment of the present invention.

Figure 5:
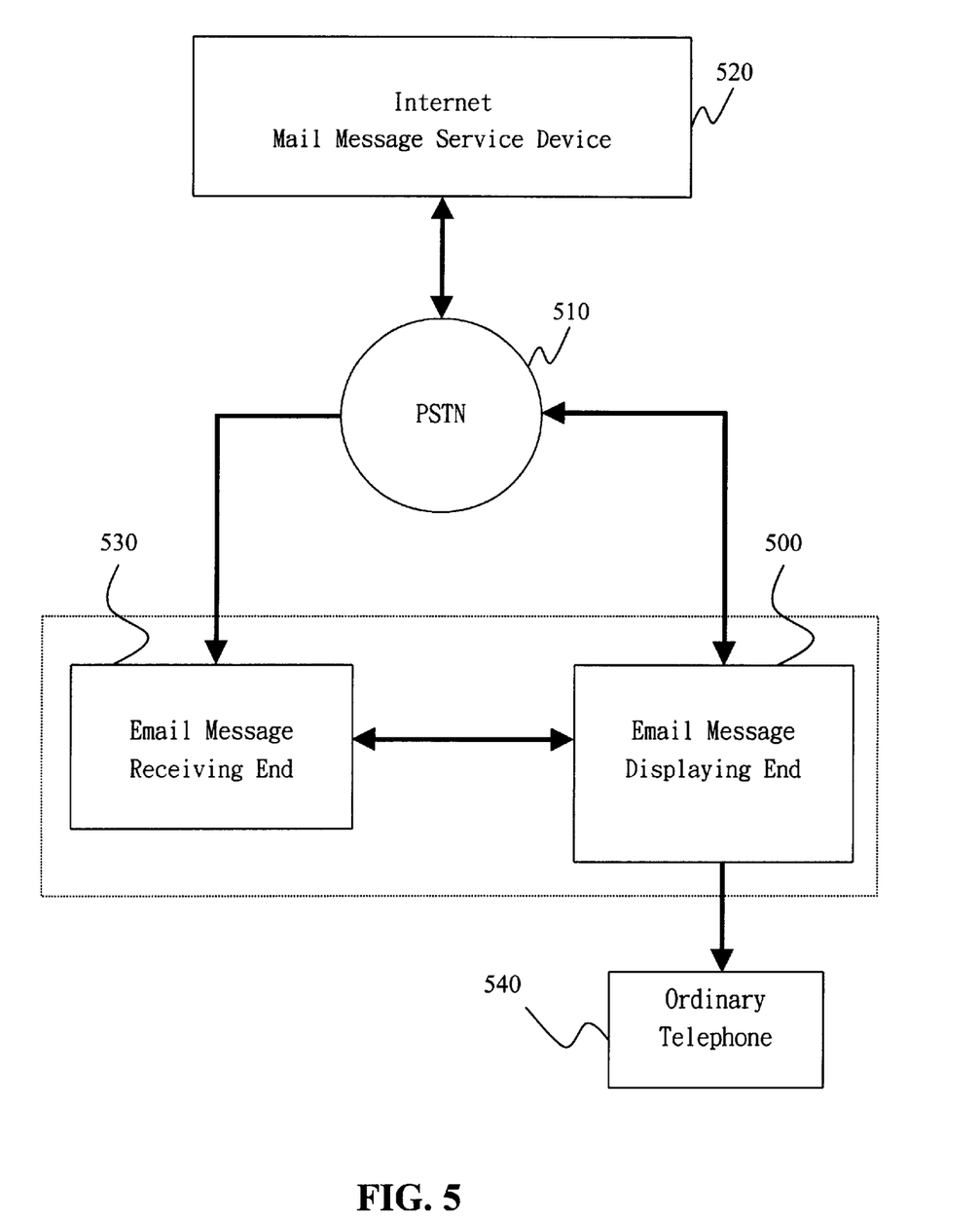
FIG. 5 is a block diagram of showing the application of an incoming E-mail checking device of another embodiment of the present invention.

FIG. 5 is a block diagram of showing the application of an incoming E-mail checking device of the present embodiment. The E-mail message displaying end 500 makes an dialup connection, through PSTN 510, to an mail message service device 520 on Internet for checking the latest mail messages. Clients can browse through the E-mail headers to determine the necessity of reading the mails, and the entire messages of those mails can be obtained through an E-mail message receiving end 530. The E-mail message displaying end 500 also has the functions of authenticating and call-waiting, which are accomplished by connecting to a plain telephone set 540.

Figure 6:
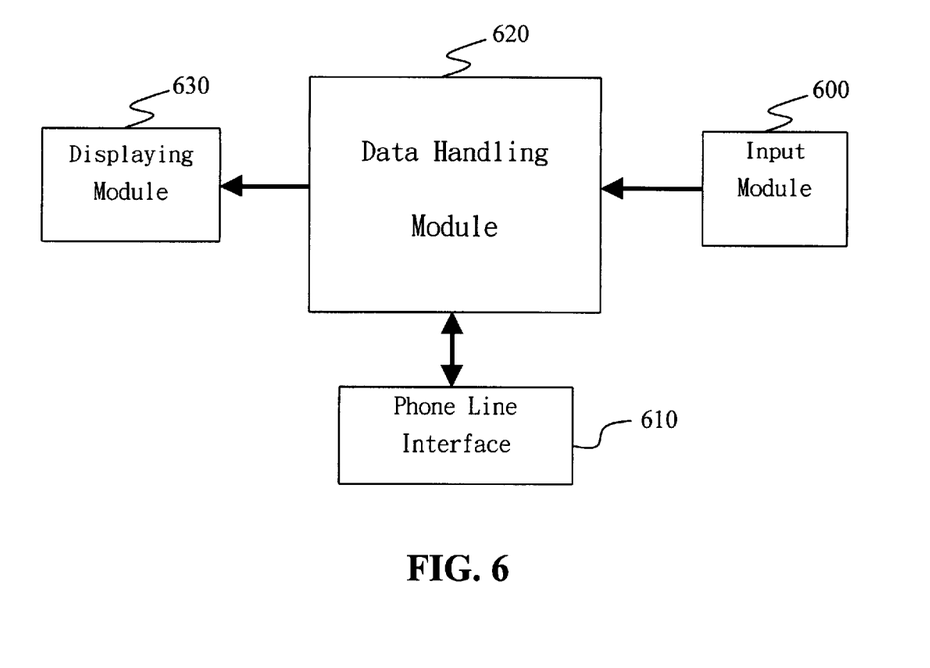
FIG. 6 is a block diagram of showing an incoming E-mail checking device of another embodiment of the present invention.

In accordance with FIG. 6, a block diagram of showing an incoming E-mail checking device that is made up of the E-mail message displaying end 500 and the E-mail message receiving end 510 of FIG. 5. This block diagram not only shows the main devices required by the present embodiment as well as the relationships between those devices. The incoming E-mail checking device of the present embodiment is capable of displaying the latest messages from an E-mail account under the conditions where there is no need to take the initiative in turning on the computer supply, wherein the checking device comprises an input module 600, a telephone line interface 610, a data handling module 620, and a displaying module 630.

In the above mentioned input module 600 can be a system keyboard, a mouse facility, a voice recognition system, or any other devices for achieving input purposes. The telephone line interface 610 comprises an analog-to-digital and digital-to-analog dual-way converter.

Figure 7:
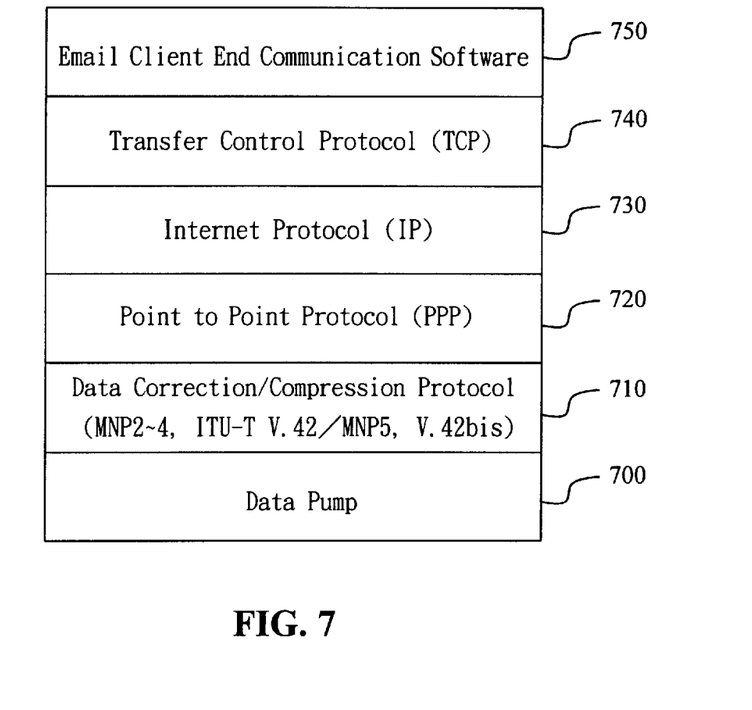
FIG. 7 is a diagram illustrating different levels of protocol in the data handling layer of the incoming E-mail checking device of another embodiment of the present invention.

Inside the data handling module 620, there at least include a MOdulator/DEModulator (modem), and a diagram illustrating different levels of protocol in the data handling device is shown in FIG. 7. Apart from the conventional data pump layer 700 and data correction/compression layer (MNP series protocols or ITU-T V.42 series protocols) 710 included within the data handling device, there even embeds a Point-to-Point Protocol (PPP) layer 720, an Internet Protocol (IP) layer 730, a Transmission Control Protocol (TCP) layer 740, and an E-mail client end communication software 750. A single central processing unit (CPU) or a plurality of CPUs can be used to realize all the functions of the above protocols.

The data pump 700 is the lowest level in the modem, whereon is the data correction/compression protocol layer 710. The data correction/compression protocol layer uses MNP2-4 to define data error correction and uses MNP5 to compress information dynamically, or uses ITU-T V.42 to define data error correction and uses V.42 bis to compress information dynamically. On top of the data correction/compression protocol layer is the PPP layer 720, which establishes a connection between an Internet user and its Internet Service Provider (ISP). The IP layer 730 is on top of the PPP layer, which is mainly used to control the flowing direction of information on Internet. The TCP layer 740 is on top of the IP layer, which is used to guarantee an error-free message transmission and to control the flow rate in transmission paths. The PPP layer 720 and the IP layer 730 work in coordination with the TCP layer 740 for accomplishing data transmissions on Internet. The topmost layer of the data handling device is the E-mail client end communication software 750, which is used for the application of sending/receiving E-mails.

Figure 8:
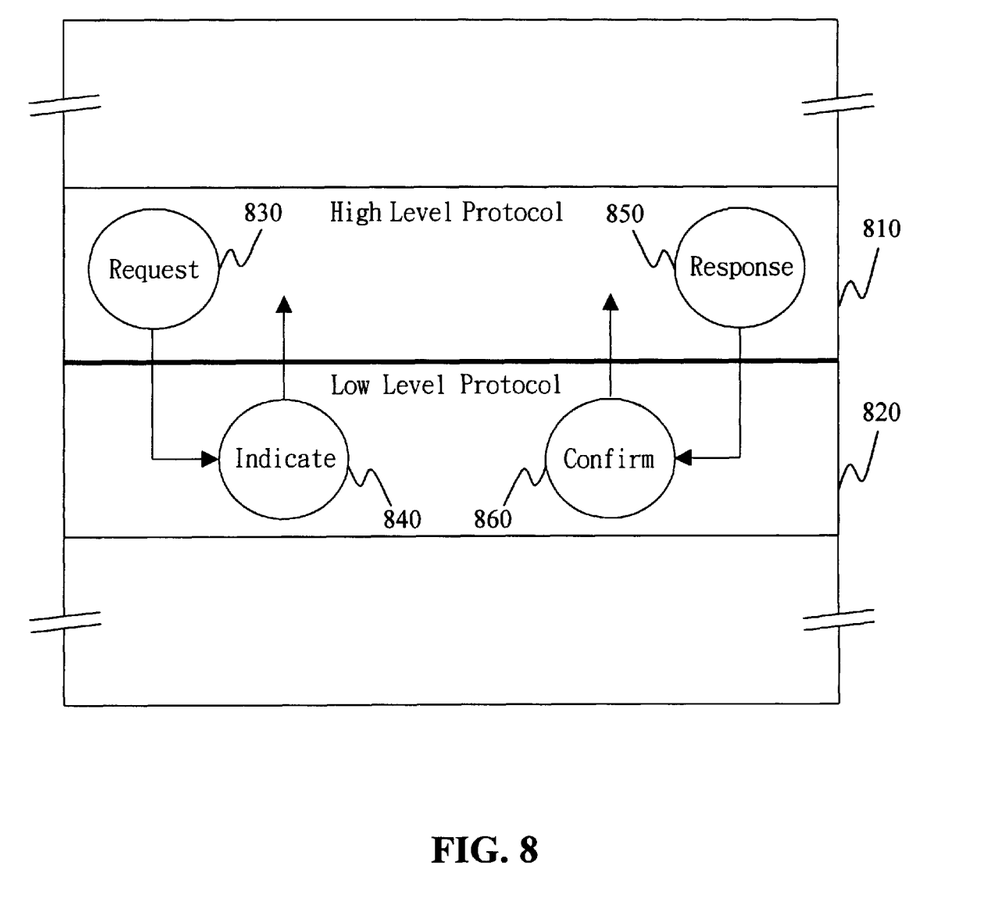
FIG. 8 shows the way of communication between two protocols in the data handling device.

FIG. 8 shows the way of communication between two protocols in the data handling device of the present embodiment, wherein the usage of primitives between a high level protocol 810 and a low level protocol 820 is illustrated. The high level protocol requests for a service by sending a "request primitive" 830 to the low level protocol. The low level protocol then uses an "indication primitive" 840 to indicate its upper level protocol. A "responsive protocol" 850 then passes back from the high level protocol and the low level protocol uses a "confirm primitive" 860 to answer the requested service, i.e. request success or request failure.

Figure 9:
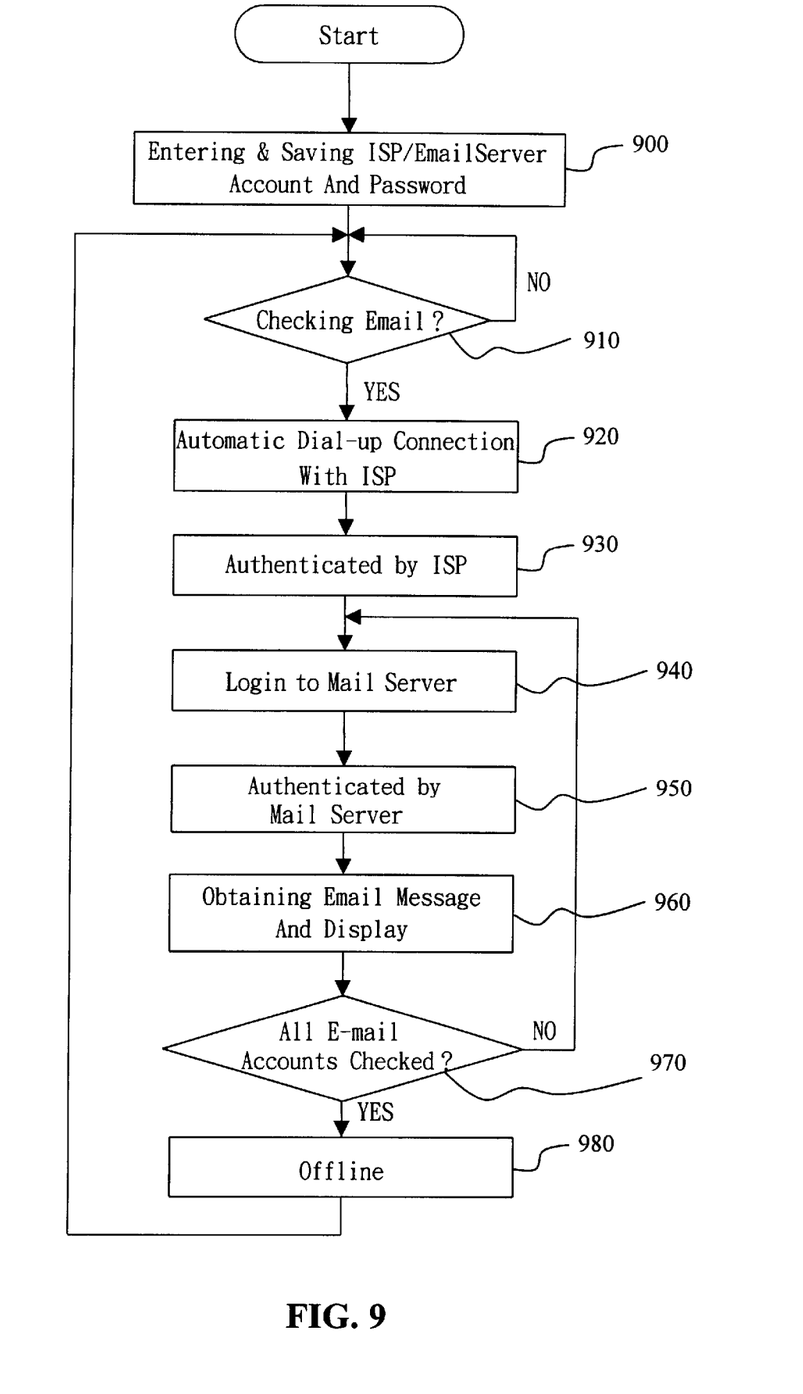
FIG. 9 is a flowchart summarizing the steps executed by another embodiment of the present invention.

FIG. 9 is a flowchart summarizing the steps executed by an incoming E-mail checking method of the present embodiment. First of all, user inputs its Internet service provider's account and password, as well as mail message service device's account and password 900 from the input module. Apart from those, the user also inputs an automatic checking time. Next, the incoming E-mail checking device will provide a choice of checking E-mails or not 910 for the user. If the user want to check its E-mails or the automatic checking time is up, the incoming E-mail checking device will automatically make a dialup connection to the net from the telephone line interface and through a communication system onto an ISP's modem 920. The connecting route comprises a wired route, such as PSTN, or a wireless route, such as satellite communication network.

After obtaining an authentication from the ISP 930, which clearly represents the connection to Internet is been established, logining to a mail message service device (POP3 is used) on Internet 940 straight away. The mail message service device's account and password are transmitted into a Post Office Protocol (version 3) server and acquiring for a corresponding authentication 950. Subsequently, an analog message sent from the Internet service provider is received, where the analog message has already been packeted by transmission control protocol, internet protocol and point-to-point protocol, and also been modulated. The modem at the user end demodulates the analog message into a digital message soon after the analog message is received. The demodulated message will be firstly analyzed and unpacketed by the point-to-point protocol then passes to its upper layer protocol, that is to analyze and unpacket again by the Internet protocol. Finally, the message is passed to the transmission control protocol for removing its header. The E-mail message that has been deal with is then sent to the E-mail client end communication software layer, the display of this E-mail, is accomplished on the displaying module 960 afterward. On this display module, user can chose whether to browse the header of the E-mail, to browse the full text of the E-mail, or to delete the E-mail. If all E-mail accounts have been checked 970 then go offline and release the connection 980, otherwise connect to another Post Office Protocol (version 3) server on Internet.

Althougt specific embodiments have been illustrated and described, it will be obvious to those skilled in the art that various modifications may be made without departing from what is intended to be limited solely by the appended claims.

What is claimed is:

1. An incoming electronic mail (email) checking system, which is capable in displaying the newest messages from an email account under the conditions where there is no need to take the initiative in turning on a computer and in getting on internet, said incoming email displaying system comprising:
   a personal computer, which is used for accomplishing client registration and sending/receiving electronic messages, both through a first network system;
   a displaying module, which comprises a light emitting indicator for indicating the arrival of a new mail from an email box, and a displaying screen for displaying relative messages of said new mail;

a mail message service device responsive to said first network system for searching a mail message in said first network system, and responsive to a transmission path for transmitting said mail message through said transmission path;

a database, which provides a storage space for said mail message service device;

a stored program control system responsive to said transmission path for receiving said mail message from said mail message service device and transmitting said mail message to said displaying module by passing through a second network system, said stored program control system is established in between said displaying module and said mail message service device.

2. The checking system in accordance with claim 1, wherein said displaying module further comprises the followings:

input means for inputting an internet service provider's account and password and a mail message service device's account and password, as well as for setting an automatic checking time;

a telephone interface end, which provides a connection gateway to an internet service provider;

data handling means responsive to said internet service provider's account and password, said mail message service device's account and password, and said connection gateway for receiving said mail message, moreover, said data handling means comprise a modem; and a displaying interface for accomplishing a displaying function and a displaying control for said mail message.

3. The checking system in accordance with claim 2, wherein said displaying interface further comprise a light emitting diode indicator.

4. The checking system in accordance with claim 2, wherein said modem is a short form of modulator/demodulator, which comprises the following functions:

an application protocol;

a transmission control protocol (TCP);

an internet protocol (IP);

a point-to-point protocol (PPP);

a data correction/compression protocol; and a data pump.

5. The checking system in accordance with claim 4, wherein said application protocol comprises an application software.

6. The checking system in accordance with claim 4, wherein to realize said functions comprises a central processing unit.

7. The checking system in accordance with claim 4, wherein to realize said functions comprises a plurality of central processing unit.

8. The checking system in accordance with claim 2, wherein said input means comprises system keyboard.

9. The checking system in accordance with claim 2, wherein said input means comprises mouse facility.

10. The checking system in accordance with claim 2, wherein said input means comprises voice recognition system and any other devices for achieving input purpose.

11. The checking system in accordance with claim 2, wherein said telephone interface end comprises an analog-to-digital and digital-to-analog converter.

12. The checking system in accordance with claim 2, wherein said connection gateway comprises a wired system.

13. The checking system in accordance with claim 12, wherein said wired system comprises a public switch telephone network.

14. The checking system in accordance with claim 2, wherein said connection gateway comprises a wireless system.

15. The checking system in accordance with claim 14, wherein said wireless system comprises a satellite communication system.

16. The checking system in accordance with claim 2, wherein said displaying control of said mail message comprises:

browsing the header of said mail message;

browsing the full text of said mail message; and deleting said mail message.

17. The checking system in accordance with claim 1, wherein said client registration can be accomplished by using any other registration channel, which comprises on phone registration and paper registration.

18. The checking system in accordance with claim 1, wherein said first network system comprises an internet system.

19. The checking system in accordance with claim 18, wherein said internet system comprises transmission control protocol/internet protocol (TCP/IP).

20. The checking system in accordance with claim 1, wherein said second network system comprises a wired system.

21. The checking system in accordance with claim 20, wherein said wired system comprises a public switch telephone network.

22. The checking system in accordance with claim 1, wherein said second network system comprises a wireless system.

23. The checking system in accordance with claim 22, wherein said wireless system comprises a satellite communication system.

24. The checking system in accordance with claim 21, wherein said public switch telephone network adopts a transmission protocol, which comprises voiceband data transmission interface.

25. The checking system in accordance with claim 23, wherein said satellite communication system adopts a transmission protocol, which comprises voiceband data transmission interface.

26. The checking system in accordance with claim 1, wherein said transmission path comprises transport layer.

27. The checking system in accordance with claim 1, wherein said transmission path comprises application layer.

28. The checking system in accordance with claim 1, wherein said transmission path comprises physical layer.

29. The checking system in accordance with claim 1, wherein said database is a readable/writable recording medium and its recording comprises:

a client full name;

a client email box address; and a client telephone number.

30. The checking system in accordance with claim 1, wherein said switching means comprises a readable/writable recording medium and at least recording said mail message.

31. The checking system in accordance with claim 1, wherein said switching means comprises a dialing function.

32. The checking system in accordance with claim 31, wherein said dialing function comprises a time-set redialing function.

33. An incoming electronic mail (email) displaying device, which is capable in displaying the newest messages in an email account under the conditions where there is no need to take the initiative in turning on a computer supply, said incoming email displaying device comprising:

an input unit, which is used for inputting an internet service provider's account and password and a mail message service device's account and password, as well as for setting an automatic checking time;

a telephone interface end, which provides a connection gateway to an internet service provider;

a data handling unit responsive to said internet service provider's account and password, said mail message service device's account and password, and said connection gateway for receiving a message, said data handling unit comprises a modulator/demodulator (modem) having embedded transmission control protocol (TCP), internet protocol (IP), and point-to-point protocol (PPP); and a displaying unit for accomplishing a displaying function and a displaying control of said message.

34. The displaying device in accordance with claim 33, wherein said modulator/demodulator further comprises the following functions:

an application protocol;

a data correction/compression protocol (MNP or ITU-T V.42 series); and a data pump.

35. The displaying device in accordance with claim 34, wherein said application protocol comprises an application software.

36. The displaying device in accordance with claim 34, wherein to realize said functions comprises a central processing unit.

37. The displaying device in accordance with claim 34, wherein to realize said functions comprises a plurality of central processing unit.

38. The displaying device in accordance with claim 33, wherein said input unit comprises system keyboard.

39. The displaying device in accordance with claim 33, wherein said input unit comprises mouse facility.

40. The displaying device in accordance with claim 33, wherein said input unit comprises voice recognition system and any other devices for achieving input purpose.

41. The displaying device in accordance with claim 33, wherein said telephone interface end comprises an analog-to-digital and digital-to-analog converter.

42. The displaying device in accordance with claim 33, wherein said connection gateway comprises a wired system.

43. The displaying device in accordance with claim 42, wherein said wired system comprises a public switch telephone network.

44. The displaying device in accordance with claim 33, wherein said connection gateway comprises a wireless system.

45. The displaying device in accordance with claim 44, wherein said wireless system comprises a satellite communication system.

46. The displaying device in accordance with claim 33, wherein said message comprises an electronic mail (email).

47. The displaying device in accordance with claim 46, wherein said displaying control of said message comprises:

browsing the header of said email;

browsing the full text of said email; and deleting said email.

48. An incoming electronic mail (email) displaying method, which is capable in displaying the newest messages in an email account under the conditions where there is no need to take the initiative in turning on a computer and in getting on internet, said incoming email displaying method comprising:

registering a client information;

storing said client information into a database;

using said client information in time searching for a new mail message in a first network system;

downloading said new mail message;

storing said new mail message into said database;

sending a corresponding data to a stored program control system by passing through a transmission path; and using said corresponding data to make dial-up connection to an end display through a second network system, and transmitting said new mail message to said end display, said end display emits light to indicate the arrival of said new mail message and also displays said new mail message.

49. The method in accordance with claim 48, wherein said client information comprises:

a client full name;

a client email box address; and a client telephone number.

50. The method in accordance with claim 48, wherein said database comprises a readable/writable recording medium.

51. The method in accordance with claim 48, wherein said stored program control system comprise a readable/writable recording medium and at least recording said corresponding data.

52. The method in accordance with claim 49, wherein said corresponding data comprises said client telephone number and said new mail message.

53. The method in accordance with claim 48 further comprises the following steps for said end display to communicate with an internet service provider:

inputting an internet service provider's account and password, as well as a mail message service device's account and password;

connecting to a modem of said internet service provider through a communication system;

logining to a post office protocol server on internet after been authenticated by said internet service provider;

transmitting said mail message service device's account and password into said post office protocol server and acquiring for a corresponding authentication;

receiving an analog message sent from said internet service provider, where said analog message has already been packeted by transmission control protocol (TCP), internet protocol (IP) and point-to-point protocol, and also been modulated;

demodulate said analog message to a digital message;

carrying out a message unpacketing procedure against said digital message; and displaying the unpacketed message.

54. The method in accordance with claim 53 even further comprises a step for setting automatic checking time.

55. The method in accordance with claim 53, wherein said message unpacketing procedure comprises:

applying point-to-point protocol to analyze and unpacket, then passing to its upper layer protocol;

applying internet protocol to analyze and unpacket, then passing to its upper layer protocol; and applying transmission control protocol to remove the header of said digital message.

56. The method in accordance with claim 55, wherein the communication method between said protocol and its upper protocol comprises:

accepting a request primitive from its upper protocol;

indicating its upper protocol for received said request primitive;

waiting for a response from its upper protocol; and confirming said request primitive generated from its upper protocol.

57. The method in accordance with claim 53, wherein said message comprises an electronic mail (email).

58. An incoming electronic mail (email) displaying method, which is capable in establishing a communication between an end user and an internet service provider, said incoming email displaying method comprising:

inputting an internet service provider's account and password, as well as a mail message service device's account and password;

connecting to a modem of said internet service provider through a communication system;

logining to a post office protocol server on internet after been authenticated by said internet service provider;

transmitting said mail message service device's account and password into said post office protocol server and acquiring for a corresponding authentication;

receiving an analog message sent from said internet service provider, where said analog message has already been packeted by transmission control protocol (TCP), internet protocol (IP) and point-to-point protocol, and also been modulated;

demodulate said analog message to a digital message;

carrying out a message unpacketing procedure against said digital message; and displaying the unpacketed message.

59. The method in accordance with claim 58 further comprises a step for setting automatic checking time.

60. The method in accordance with claim 58, wherein said message unpacketing procedure comprises:

applying point-to-point protocol to analyze and unpacket, then passing to its upper layer protocol;

applying internet protocol to analyze and unpacket, then passing to its upper layer protocol; and applying transmission control protocol to remove the header of said digital message.

61. The method in accordance with claim 60, wherein the communication method between said protocol and its upper protocol comprises:

accepting a request primitive from its upper protocol;

indicating its upper protocol for received said request primitive;

waiting for a response from its upper protocol; and confirming said request primitive generated from its upper protocol.

62. The method in accordance with claim 58, wherein said inputting procedure comprises system keyboard.

63. The method in accordance with claim 58, wherein said inputting procedure comprises mouse facility.

64. The method in accordance with claim 58, wherein said inputting procedure comprises voice recognition system and any other devices for achieving input purpose.

65. The method in accordance with claim 58, wherein said communication system comprises a wired system.

66. The method in accordance with claim 65, wherein said wired system comprises a public switch telephone network.

67. The method in accordance with claim 58, wherein said communication system comprises a wireless system.

68. The method in accordance with claim 67, wherein said wireless system comprises a satellite communication system.

69. The method in accordance with claim 58, wherein said message comprises an electronic mail (email).

* * * * *